(12) United States Patent
Nannet et al.

(10) Patent No.: US 12,439,908 B2
(45) Date of Patent: Oct. 14, 2025

(54) GEOFENCE SYSTEM FOR LIMITING VEHICLE USAGE

(71) Applicant: CNH Industrial America LLC, New Holland, PA (US)

(72) Inventors: Bryan Nannet, Burr Ridge, IL (US); Brian Hartman, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 486 days.

(21) Appl. No.: 17/871,733

(22) Filed: Jul. 22, 2022

(65) Prior Publication Data

US 2024/0023535 A1  Jan. 25, 2024

(51) Int. Cl.
| | | |
|---|---|---|
| *A01M 7/00* | (2006.01) | |
| *A01B 79/02* | (2006.01) | |
| *B60W 50/14* | (2020.01) | |
| *H04W 4/021* | (2018.01) | |

(52) U.S. Cl.
CPC ........... *A01M 7/0089* (2013.01); *A01B 79/02* (2013.01); *B60W 50/14* (2013.01); *H04W 4/021* (2013.01); *B60W 2050/146* (2013.01); *B60W 2300/15* (2013.01); *B60W 2520/06* (2013.01); *B60W 2520/105* (2013.01); *B60W 2710/18* (2013.01)

(58) Field of Classification Search
CPC .... A01M 7/0089; A01B 79/02; A01B 79/005; B60W 50/14; B60W 2050/146; B60W 2300/15; B60W 2520/06; B60W 2520/105; B60W 2710/18; H04W 4/021
See application file for complete search history.

(56) References Cited

U.S. PATENT DOCUMENTS

| | | | |
|---|---|---|---|
| 8,965,643 B2 | 2/2015 | Peterson et al. | |
| 2013/0021174 A1* | 1/2013 | Silzer, Sr. | G05D 1/0278 |
| | | | 701/34.4 |
| 2018/0368330 A1* | 12/2018 | Kurata | A01F 15/08 |
| 2019/0208695 A1* | 7/2019 | Graf Plessen | A01B 69/008 |
| 2020/0103906 A1* | 4/2020 | O'Donnell | G05D 1/0278 |
| 2020/0158029 A1* | 5/2020 | Fletcher | F02D 29/02 |
| 2020/0364884 A1* | 11/2020 | Trim | G01S 19/42 |

* cited by examiner

*Primary Examiner* — Ig T An
(74) *Attorney, Agent, or Firm* — Foley & Lardner LLP

(57) ABSTRACT

A method for controlling an operation of an agricultural vehicle comprising: receiving a geo-fencing plan for the agricultural vehicle, determining an allowed area for executing an agricultural action based on the geo-fencing plan, determining a current location of the agricultural vehicle, comparing the current location of the agricultural vehicle to one or more predetermined locations to determine whether the agricultural vehicle is in the allowed area for executing the agricultural action, and in response to determining that the agricultural vehicle is not in the allowed area, executing an action to prevent the agricultural vehicle from executing the agricultural action.

20 Claims, 5 Drawing Sheets

GEOFENCE SYSTEM FOR LIMITING VEHICLE USAGE

BACKGROUND

The present disclosure relates generally to vehicle controls for industrial vehicles such as agricultural vehicles or construction vehicles. More specifically, the present disclosure relates to determining the position of the industrial vehicle and implementing one or more control actions in the industrial vehicle based on the determined position of the vehicle.

SUMMARY

One embodiment relates to a method. The method includes: receiving a geo-fencing plan for the agricultural vehicle, determining an allowed area for executing an agricultural action based on the geo-fencing plan, determining a current location of the agricultural vehicle, comparing the current location of the agricultural vehicle to one or more predetermined locations to determine whether the agricultural vehicle is in the allowed area for executing the agricultural action, and in response to determining that the agricultural vehicle is not in the allowed area, executing an action to prevent the agricultural vehicle from executing the agricultural action In one embodiment, the one or more predetermined locations are determined based on the allowed area. In one embodiment, the method includes utilizing the agricultural vehicle to execute the agricultural action in response to determining that the agricultural vehicle is in the allowed area. In one embodiment, the method includes, in response to preventing the agricultural vehicle from executing the agricultural action, generating and displaying a warning message on a user interface associated with the agricultural vehicle. In one embodiment, The method also includes receiving an override signal configured to override a geo-fencing control and, responsive to receiving the override signal, discontinuing the action to prevent the agricultural vehicle from executing the agricultural action when the agricultural vehicle is not in the allowed area.

In one embodiment, the geo-fencing plan includes a plurality of different defined areas in which one or more agricultural actions are allowed or prevented, wherein the one or more agricultural actions includes at least one of an application of one or more chemicals, a planting of one or more crops, and a harvesting of one or more crops. In one embodiment, the agricultural action includes at least one of tilling the allowed area, irrigating the allowed area, planting the allowed area, and harvesting the allowed area. In one embodiment, the action includes at least one of engaging a braking system for the agricultural vehicle to prevent movement of the agricultural vehicle and disabling an implement of the agricultural vehicle.

Another embodiment relates to a method for controlling an operation of an agricultural vehicle. The method includes: receiving a geo-fencing plan for the agricultural vehicle, determining a prohibited area for executing an agricultural action based on the geo-fencing plan, determining a current location of the agricultural vehicle, comparing the current location of the agricultural vehicle to one or more predetermined locations to determine whether the agricultural vehicle is in the prohibited area for executing the agricultural action, and in response to determining that the agricultural vehicle is in the prohibited area, executing an action to prevent the agricultural vehicle from executing the agricultural action.

In one embodiment, the method further includes: receiving movement data describing the position, acceleration, and direction of the agricultural vehicle; analyzing the movement data to predict whether the agricultural vehicle is moving towards the prohibited area; and in response to the prediction, executing the action to prevent the agricultural vehicle from executing the agricultural action, wherein the action includes at least one of displaying a warning message to an operator of the agricultural vehicle or disabling the agricultural vehicle.

In one embodiment, the method further includes receiving an override signal configured to override a geo-fencing control and, responsive to receiving the override signal, discontinuing the action to prevent the agricultural vehicle from executing the agricultural action when the agricultural vehicle is in the prohibited area. In one embodiment, the geo-fencing plan includes a plurality of different defined areas in which one or more agricultural actions are allowed or prevented, wherein the one or more agricultural actions includes at least one of an application of one or more chemicals, a planting of one or more crops, and a harvesting of one or more crops. In one embodiment, the one or more predetermined locations are determined based on the prohibited area. In one embodiment, the action includes at least one of engaging a braking system for the agricultural vehicle to prevent movement of the agricultural vehicle and disabling an implement of the agricultural vehicle. In one embodiment, The method further includes, in response to determining that the agricultural vehicle is not in the prohibited area, utilizing the agricultural vehicle to execute the agricultural action.

Still another embodiment relates to a geo-fencing vehicle control system. The geo-fencing vehicle control system includes an agricultural vehicle, a sprayer, and a vehicle control system. The agricultural vehicle includes a driveline configured to propel the agricultural vehicle and an operator interface configured receive inputs from a user and display messages to the user. The sprayer is coupled to the agricultural vehicle and is configured to distribute a chemical. The vehicle control system includes one or more processing circuits, each processing circuit including a processor and a memory, the memory having instructions stored thereon that, when executed by the processor, cause the processing circuit to: receive a geo-fencing plan for the agricultural vehicle, determine a prohibited area for distributing the chemical by the sprayer based on the geo-fencing plan, determine a current location of the agricultural vehicle, comparing the current location of the agricultural vehicle to one or more predetermined locations to determine whether the agricultural vehicle is in the prohibited area for distributing the chemical by the sprayer, and in response to determining that the agricultural vehicle is in the prohibited area, preventing the sprayer from distributing the chemical.

In one embodiments, the one or more predetermined locations are determined based on the allowed area. In one embodiment, the instructions cause the processing circuit to generate and display a warning message on the operator interface in response to preventing the sprayer from distributing the chemical. In one embodiment, the instructions cause the processing circuit to receive an override signal configured to override a geo-fencing control and discontinue preventing the sprayer from distributing the chemical when the agricultural vehicle is in the prohibited area in response to receiving the override signal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
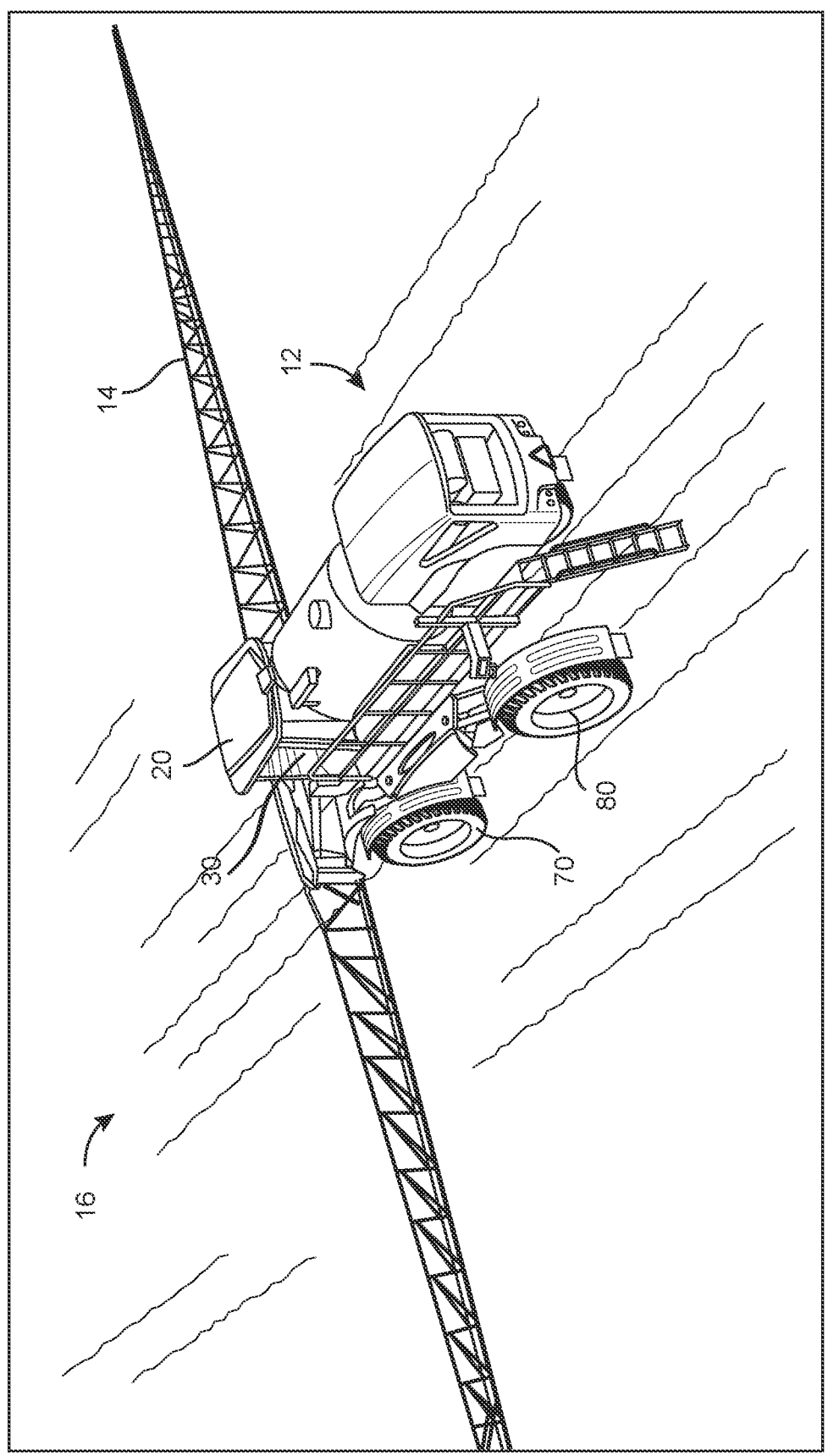
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Industrial vehicles such as agricultural vehicles (e.g., tractors, tillers, planters, and fertilizers, etc.) may be utilized in agricultural applications to facilitate the growing of crops. Typically, one or more users will manually control operation of the industrial vehicle to accomplish agricultural tasks such as tilling the land, planting crops, watering and fertilizing crops, and harvesting crops. However, since users are manually operating the industrial vehicle, the agricultural tasks may be accomplished incorrectly due to human error. For example, common mistakes that may be made include planting the wrong seeds in a certain area, overwatering/ under watering the crops, applying an incorrect type or amount of chemical (e.g., fertilizer, pest control, etc.), to the wrong area at the wrong time, or harvesting too soon, just to name a few examples. Therefore, systems and methods for automating control of industrial vehicles to reduce human error by only allowing certain agricultural tasks to be carried out in certain areas may be desired.

Systems and methods directed towards the control of industrial vehicles are described in the present application. More specifically, a geofence system for controlling industrial vehicles is described in which a user predetermines one or more areas within an agricultural field or area to be enclosed within a "geofence". A geofence may be described as a virtual marker or boundary that encloses and defines a geographical area. For example, an agricultural geofence may enclose a portion of land that may be used for an agricultural purpose such as growing crops. Once the user has predetermined the one or more areas, the user may define one or more rules that govern which agricultural tasks may be accomplished within the predetermined area. For example, a user may have a plot of land in which they would like to grow 3 different types of crops. The user may divide the plot of land into 4 sections and predetermine where to grow the three different types of crops and which section to allow to lie fallow. It should be understood that "geofence" as utilized in the present disclosure can include any type or manner of defining a geographic area, including, but not limited to, a particular radius/diameter around a point, a set of boundaries defined, for example, according to geographic coordinates, or any other manner of defining a geographic area into which the vehicle is allowed to or prohibited from moving and/or is allowed to or prohibited from executing certain actions (e.g., activating certain implements). All such implementations are contemplated within the scope of the present disclosure.

For the purposes of the present disclosure, the term "vehicle" refers to any equipment that can be moved (e.g., within a field), regardless of whether the equipment includes a prime mover or other device configured to move the equipment under its own power. For example, the term "vehicle" applies to powered equipment such as a tractor, combine, harvester, etc., but the term "vehicle" also applies to equipment that moves through the assistance of another vehicle, such as various agricultural or construction implements that are attached/coupled to another vehicle (e.g., implements such as irrigation machinery, soil cultivation implements, planting equipment, harvesting implements, etc. that are attached to and moved by a tractor or other vehicle). Though agricultural vehicles are primarily described in the present disclosure, the systems and methods herein may be applied in a variety of industrial applications including construction.

Figure 2:
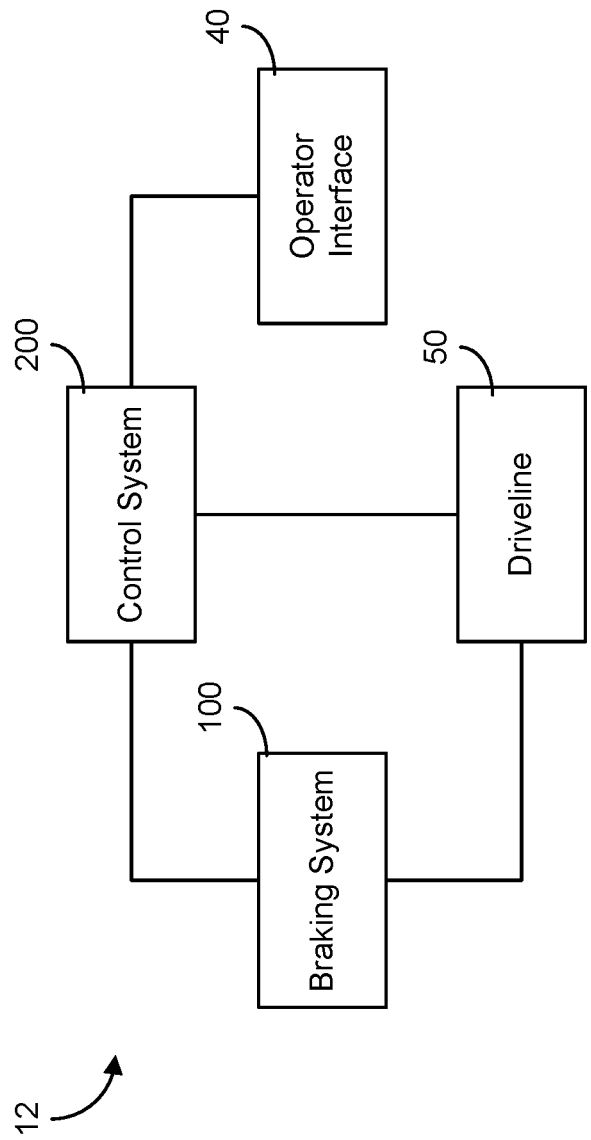
FIG. 2 a schematic block diagram of the vehicle of FIG. 1, according to an exemplary embodiment.
Figure 3:
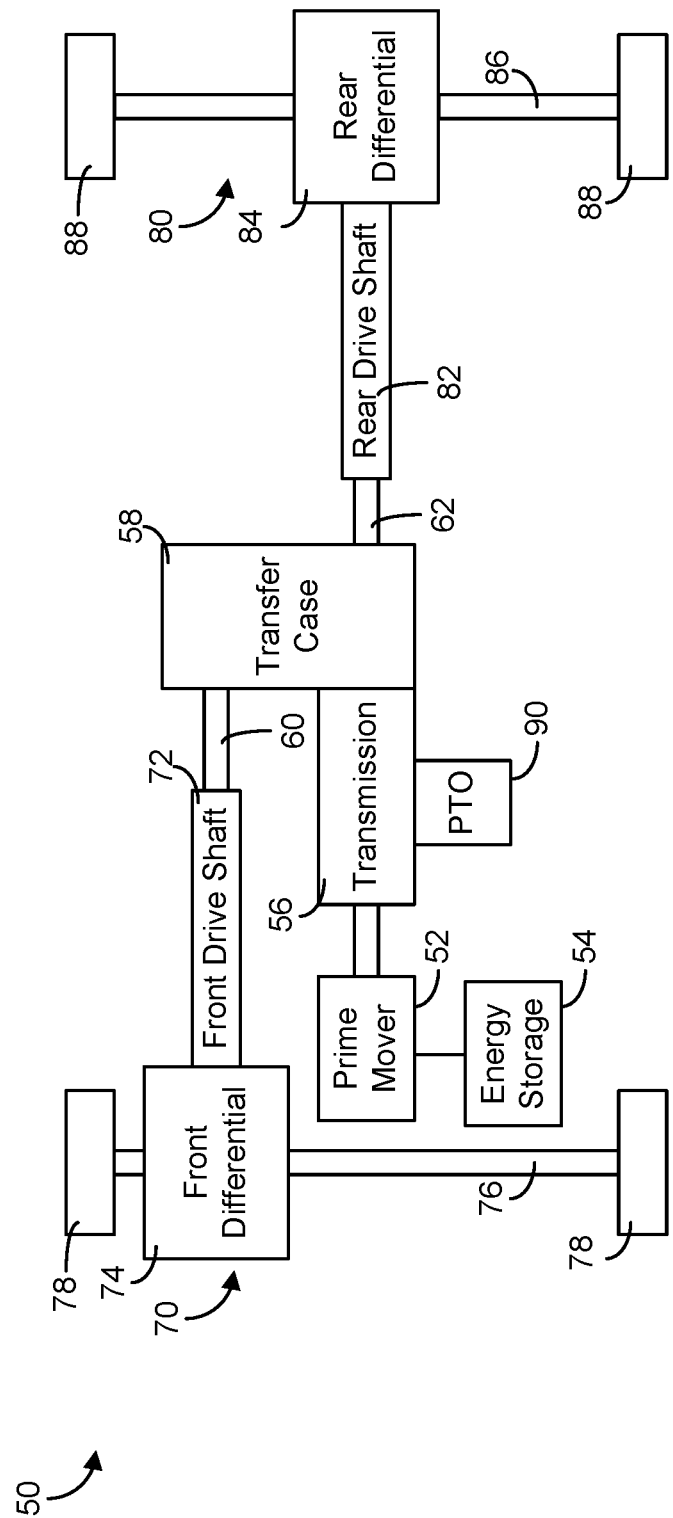
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 12, a body assembly, shown as body 20, coupled to a vehicle frame and having an occupant portion or section, shown as cab 30. The cab 30 may include one or more operator input and output devices that are disposed within the cab 30. The operator input and output devices may include a steering wheel, a gear shift, and/or a display screen. The vehicle 12 may be propelled by a drivetrain 50, which is described in more detail with respect to FIG. 3. The vehicle 12 may also include a vehicle braking system 100, coupled to one or more components of the driveline 50 to facilitate selectively braking the one or more components of the driveline 50. The vehicle 12 also includes a vehicle control system, shown as control system 200, coupled to the operator interface 40, the driveline 50, and the braking system 100. In other embodiments, the vehicle 10 includes more or fewer components. In the exemplary embodiment shown in FIG. 1, the vehicle 12 is an agricultural vehicle with a sprayer implement 14 that is structured to distribute a chemical within an agricultural area 16.

It should be understood that the vehicle 12 shown in FIG. 1 is merely one example, and the features of the present disclosure can be used with any type of vehicle (e.g., any type of industrial vehicle, such as an agricultural or construction vehicle) in various example embodiments. According to an exemplary embodiment, the vehicle 12 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 12 may include one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 12. In some embodiments, the cab 30 is configured to provide seating for one or more passengers of the vehicle 12. According to an exemplary embodiment, the operator interface 40 is configured to provide an operator with the ability to control one or more functions of and/or provide commands to the vehicle 12 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIG. 3, a front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIG. 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Figure 4:
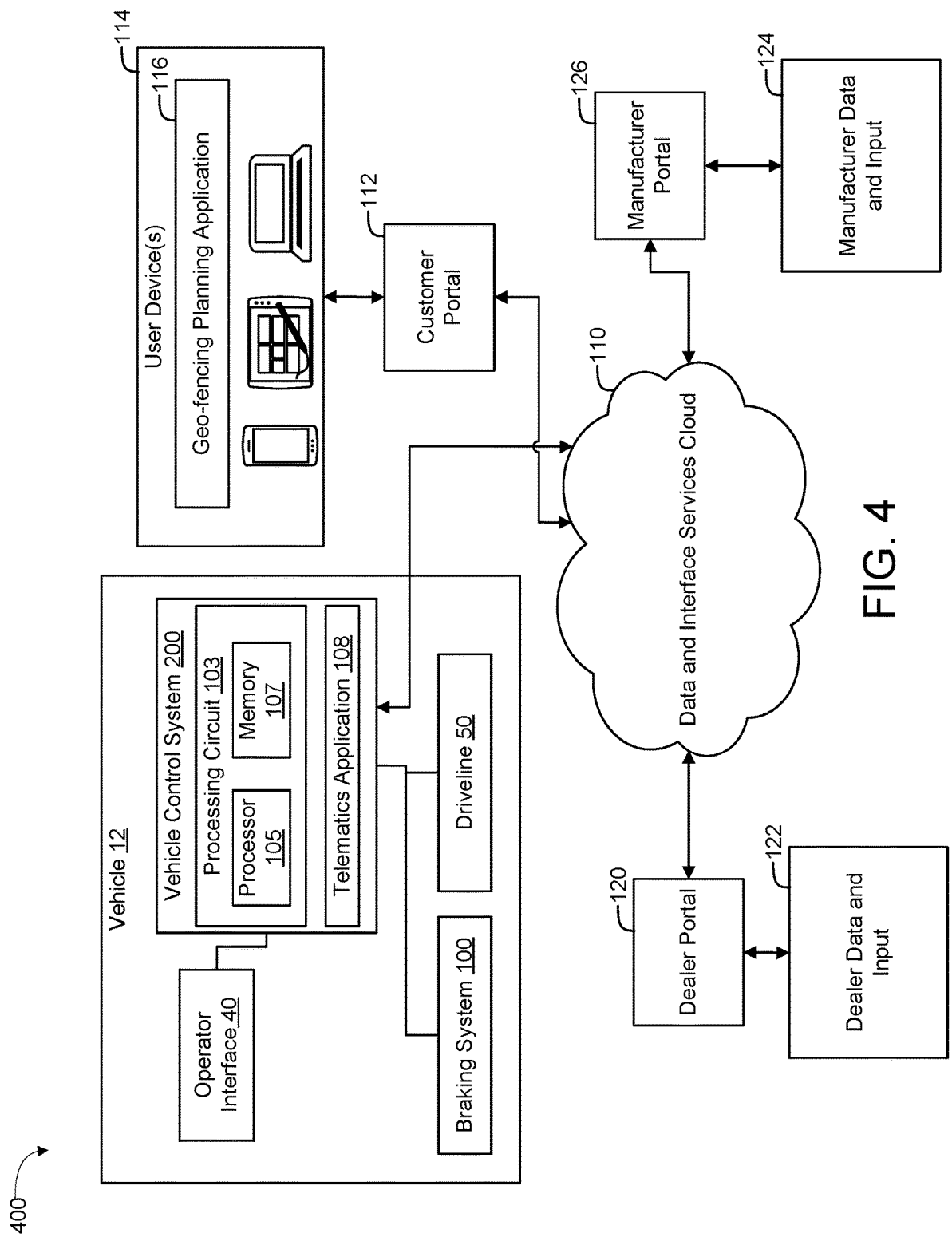
FIG. 4 is a schematic block diagram of a geofence system for controlling the vehicle of FIG. 1, according to an exemplary embodiment.

Referring now to FIG. 4, a schematic block diagram of a geofence system 400 for controlling the vehicle 12 is shown, according to an exemplary embodiment. The geofence system 400 includes the vehicle 12 communicably coupled to a dealer portal 120, a manufacturer portal 126, and a customer portal 112. The vehicle 12 may be configured to receive information and data from the dealers and/or manufactures through the dealer portal 120 and the manufacturer portal 126. For example, dealer data and input 122 may be received by a data and interface services cloud 110 through the dealer portal 120 and manufacturer data and input 124 through the manufacturer portal 126. The vehicle 12 may then receive this information from the data and interface services cloud 110. It should be understood that the combination of elements shown in FIG. 4 is provided merely by way of example, and in various embodiments, various implementations may add additional elements or omit certain elements. For example, in some embodiments, the geofence system 400 may include the vehicle control system 200 and may be configured to receive a geo-fencing plan from a user device 114 but may not communicate with a dealer portal 120 and/or a manufacturer portal 126. In some embodiments, the vehicle control system 200 may be configured to allow a user to define the geo-fencing plan directly on the vehicle (e.g., via an operator interface 40, such as by allowing specification via that interface of an intended plan as to what crop is to be planted in what field, what chemical is to be applied to what field, etc.). In some such embodiments, the geofence system 400 may or may not include a geo-fencing planning application 116 on a user device 114 and/or may or may not allow a user to remotely define a geo-fencing plan and send the plan to the vehicle 12.

Additionally, the vehicle 12 is configured to receive one or more user inputs through the customer portal 112. More specifically, a user may enter input into a user device 114 to use geo-fencing planning application 116. The geo-fencing application 116 is configured to create a geo-fencing plan based on inputs received by the user. More specifically, the geo-fencing planning application may plan one or more agricultural applications for a geo-fenced agricultural area. For example, the geo-fencing application 116 may be configured to divide a 20-acre geo-fenced agricultural area into smaller geo-fenced agricultural areas. The geo-fencing planning application 116 may then be configured to plan which agricultural applications (e.g., which crops to plant, which crops to fertilize, which crops to apply chemicals to, which crops may be harvested, etc.) may be implemented in each of smaller geo-fenced agricultural areas. The user may enter their inputs for creating the geo-fencing plan created by the geo-fencing planning application through user device(s) 114 which may include a cell phone, a tablet, and/or a computer. The geo-fencing plan created by the geo-fencing planning application 116 may then be sent to the data and interface services cloud 110 through the customer portal 112. In various embodiments, the geo-fencing planning application 116 may be installed on the user device 114 (e.g., as an installed app) and/or may be accessible on the user device 114 but not installed on the device (e.g., accessible via a web browser or other remote interface).

In one embodiment, one geo-fencing plan may lay out the organization of crops within an agricultural space. For example, the agricultural space may be divided into two or more sections in which different plants may be planted in such a geo-fencing plan. In that case, the geo-fencing plan may be implemented by ensuring that the agricultural vehicle only plants the right crops within each area (e.g., only corn planted in a first section and only wheat planted in the second section. In some embodiments, the vehicle may be allowed or prevented from executing an agricultural action based on the geographic location of the vehicle. For example, returning to the previous example, if an agricultural vehicle carrying corn seed travels to the geographic location where only wheat is supposed to be planted, the vehicle control system may disable either the vehicle and/or the associated implement to prevent the wrong crop from being planted. In other embodiments, the vehicle may be allowed or prevented from executing an agricultural action based on the time of operation for the vehicle. For example, harvesting crops may only be permitted during certain time periods. In this case, if an agricultural vehicle attempts to harvest crops outside of the certain time period, the vehicle control system 200 may prevent the vehicle from harvesting the crops by disabling either the vehicle or the harvesting implement.

In one embodiment, the geo-fencing plan may lay out which chemicals are permitted and/or not permitted from being distributed within one or more sections of an agricultural space. In some embodiments, the chemicals which are permitted and/or not permitted may be based on the crops growing within the one or more sections of the agricultural space. For example, the geo-fencing plan may lay out which fertilizers, pesticides, and/or herbicides may be permitted to distributed a first section based on the crop being grown in first section. If the vehicle attempts to distribute a chemical substance that is not permitted within the first section, the vehicle control system 200 may prevent the vehicle from distributing the chemical by disabling either the vehicle or the harvesting implement. If the vehicle attempts to distribute a permitted chemical substance a section, the vehicle control system 200 may enable the vehicle and/or the vehicle implement.

The vehicle control system 200 is configured to receive the geo-fenced agricultural plan from the data and interface services cloud 110 and control operation of the vehicle 12 to implement the geo-fencing plan. The vehicle control system 200 includes a processing circuit 103 which is configured to execute the geo-fencing plan received by the vehicle control system 200. The vehicle control system 200 may be structured as one or more electronic control units (ECU). The vehicle control system 200 may be separate from or included with at least one of a transmission control unit, an exhaust aftertreatment control unit, a powertrain control module, an engine control module, etc. In one embodiment, the components of the vehicle control system 200 are combined into a single unit. In another embodiment, one or more of the components may be geographically dispersed throughout the vehicle 12. In this regard, various components of the vehicle control system 200, discussed below, may be dispersed in separate physical locations of the vehicle 12.

The vehicle control system 200 is also shown to include a telematics application 108. The telematics application 108 may be structured as any type of telematics control unit. Accordingly, the telematics application 108 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics application 108 and one or more remote devices (e.g., a user device(s) 114, data and interface services cloud 110, etc.). In this regard, the communications interface may be configured as any type of mobile communications interface or protocol including, but not limited to, Wi-Fi, WiMAX, Internet, Radio, Bluetooth, Zigbee, satellite, radio, Cellular, GSM, GPRS, LTE, and the like. The telematics application 108 may also include a communications interface for communicating with the vehicle control system 200 of the vehicle 12. The communication interface for communicating with the vehicle control system 200 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the vehicle control system 200 and the telematics application 108. In other embodiments, a local area network (LAN), a wide area network (WAN), or an external computer (for example, through the Internet using an Internet Service Provider) may provide, facilitate, and support communication between the telematics application 108 and the vehicle control system 200.

Vehicle control system 200 is also shown to include a processing circuit 103 having a processor 105 and a memory 107. In some embodiments, the processor 105 can be a general purpose or specific purpose processor, an application specific integrated circuit (ASIC), one or more field programmable gate arrays (FPGAs), a group of processing components, or other suitable processing components. The processor 105 may be configured to execute computer code or instructions stored in memory 107 or received from other computer readable media (e.g., CDROM, network storage, a remote server, etc.).

Memory 107 may include one or more devices (e.g., memory units, memory devices, storage devices, or other computer-readable media) for storing data and/or computer code for completing and/or facilitating the various processes described in the present disclosure. Memory 107 may include random access memory (RAM), read-only memory (ROM), hard drive storage, temporary storage, non-volatile memory, flash memory, optical memory, or any other suitable memory for storing software objects and/or computer instructions. Memory 107 may include database components, object code components, script components, or any other type of information structure for supporting the various activities and information structures described in the present disclosure. Memory 107 may be communicably connected to the processor 105 via the processing circuit 103 and may include computer code for executing (e.g., by processor 105) one or more of the processes described herein.

As mentioned above, the vehicle control system 200 is configured to receive a geo-fencing plan from a user through the data and interface services cloud 110 and control operation of the vehicle 12 based on the received geo-fencing plan. More specifically, the vehicle control system 200 is configured to determine the location of the vehicle 12, compare the location of the vehicle 12 to the geo-fencing plan, and implement one or more agricultural actions for the vehicle 12 based on the comparison. For example, the vehicle control system 200 may receive a geo-fencing plan that designates a first geo-fenced area to be planted with corn and a second geo-fenced portion to be chemically treated. In this case, the vehicle control system 200 determines the location of the vehicle 12 and compares it to the geo-fencing plan to determine whether the vehicle 12 is in the first geo-fenced portion or the second geo-fenced portion. If the vehicle 12 is in the first geo-fenced portion, the vehicle control system 200 may allow the vehicle to plant corn seeds while preventing the vehicle 12 from chemically treating the first geo-fenced portion by disabling the sprayer 14 and/or engaging the breaking system 100. Thereby, the vehicle control system 200 enables or prevents the vehicle 12 from executing one or more agricultural actions based on the location of the vehicle 12 and the geo-fencing plan. In some embodiments, if the vehicle control system 200 is preventing the vehicle 12 from executing an agricultural action as requested by the user, the vehicle control system 200 may cause a message to be displayed on the operator interface 40 informing the user driving the vehicle 12 of why such an agricultural action is being prevented.

Figure 5:
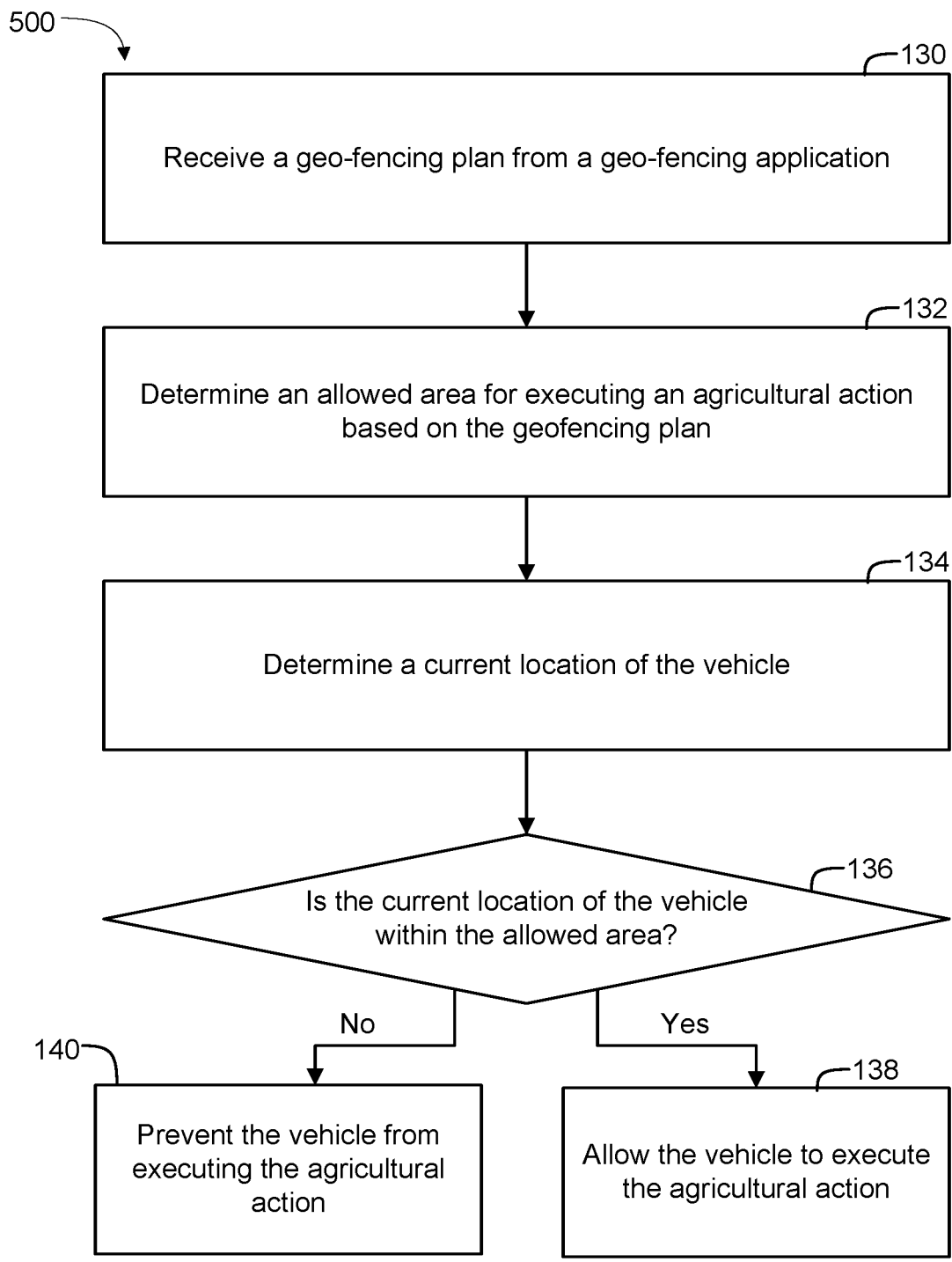
FIG. 5 is a flow diagram of a method for controlling the vehicle of FIG. 1, according to an exemplary embodiment.

Referring now to FIG. 5, a method 500 for controlling the operation of the vehicle 12 based on a geo-fencing plan is shown, according to an exemplary embodiment. In some embodiments, the method 500 may be executed by the geofence system 400. More specifically, the method 500 may be executed by the vehicle control system 200.

At step 130, the vehicle control system 200 receives a geo-fencing plan from the geo-fencing planning application 116. The geo-fencing plan describes what agricultural applications are planned throughout a geo-fenced area. For example, the geo-fencing plan may describe which crops will be planted in an agricultural area and where the crops will be planted. As another example, the geo-fencing plan may describe which chemical treatments may be applied and where the chemicals may be applied within a geo-fenced area.

At step 132, the vehicle control system 200 determines an allowed area for executing an agricultural action based on the geo-fencing plan received at step 132. The allowed area may be marked by a geo-fence which designates the boundary between an allowed area for executing an agricultural action and areas outside the allowed area. Alternatively, at step 132, the vehicle control system 200 may determine a prohibited area for executing an agricultural action. At step 134, the vehicle control system 200, determines a current location of the vehicle 12. In some embodiments, the vehicle control system 200 determines the current location of the vehicle 12 using the telematics application 108. As mentioned above, the telematics application 108 may include a location positioning system (e.g., global positioning system, a global navigation satellite system, etc.) to track the location of the vehicle (e.g., latitude and longitude data, elevation data, etc. Therefore, the vehicle control system 200 determines the current location of the vehicle 12 by utilizing the telematics application 108.

At step 136, the vehicle control system 200 compares the current location of the vehicle 12 as determined at step 134 to the allowed area and/or prohibited area for executing an agricultural action as determined at step 132 to determine if the current location of the vehicle 12 is within the allowed area and/or prohibited area. If the current location of the vehicle 12 is within the allowed area, the vehicle control system 200 may allow the vehicle 12 to execute the agricultural action at step 138. For example, the vehicle 12 may be in a geo-fenced area for growing a crop that requires pesticides to grow properly. In this case, the vehicle control system 200 would compare the location of the vehicle 12 to the geo-fenced area to determine if the vehicle 12 is in the geo-fenced area. If vehicle 12 is in the allowable area, then the vehicle control system would allow the vehicle 12 to spray the pesticide within the geo-fenced area at step 138. Alternatively, if the vehicle is in the prohibited area, the vehicle control system 200 may prevent the vehicle 12 from executing the agricultural action. If the current location of the vehicle 12 is not within the allowed area, the vehicle control system 200 may prevent the vehicle 12 from executing the agricultural action. In some embodiments, the vehicle control system 200 may prevent the vehicle 12 from executing the agricultural action by disabling one or more components of the vehicle 12. For example, if the vehicle 12 is an agricultural vehicle with a sprayer implement for distributing a chemical within the field, the vehicle control system 200 may disable the sprayer implement to prevent the vehicle 12 from distributing a chemical within a field. As another example, if the vehicle 12 is an agricultural vehicle with a tilling implement for tilling a field, the vehicle control system 200 may disable the tilling implement to prevent the vehicle 12 from executing the agricultural action. In some embodiments, the vehicle control system 200 may prevent the vehicle 12 from executing the agricultural action by engaging the braking system 100 to prevent the vehicle 12 from moving. In some embodiments, the vehicle control system 200 may send a message to the operator interface 40 notifying the user that the vehicle is being prevented from executing an agricultural action at step 138.

In some embodiments, the vehicle control system 200 may analyze movement data for the vehicle 12 to predict a future location of the vehicle 12. By predicting a future location of the vehicle 12, the vehicle control system 200 can determine whether the vehicle 12 is heading outside the allowable area and provide an alert to the operator interface 40 warning the user that the vehicle 12 will be prevented from executing an agricultural action if the vehicle 12 leaves the allowed area. Additionally, based on the prediction, the vehicle control system 200 may preemptively prevent the vehicle 12 from executing the agricultural action.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A method for controlling an operation of an agricultural vehicle comprising:
   receiving a geo-fencing plan for the agricultural vehicle;
   determining an allowed area into which the agricultural vehicle is permitted to enter for applying a chemical based on the geo-fencing plan;
   determining a current location of the agricultural vehicle;
   comparing the current location of the agricultural vehicle to one or more predetermined locations to determine whether the agricultural vehicle is in the allowed area for applying the chemical;
   in response to determining that the agricultural vehicle is not in the allowed area, disabling a sprayer associated with the agricultural vehicle to prevent applying the chemical outside the allowed area; and
   in response to determining that the agricultural vehicle is in the allowed area with an unpermitted chemical, disabling the sprayer.

2. The method of claim 1, wherein the one or more predetermined locations are determined based on the allowed area.

3. The method of claim 1, further comprising, in response to determining that the agricultural vehicle is in the allowed area, utilizing the agricultural vehicle to apply the chemical.

4. The method of claim 1, further comprising, in response to preventing the agricultural vehicle from applying the chemical, generating and displaying a warning message on a user interface associated with the agricultural vehicle.

5. The method of claim 1, further comprising:
   receiving an override signal configured to override a geo-fencing control; and
   responsive to receiving the override signal, enabling the sprayer.

6. The method of claim 1, wherein the geo-fencing plan includes a plurality of different defined areas in which one or more agricultural actions are allowed or prevented.

7. The method of claim 6, wherein the one or more agricultural actions include at least one of tilling the allowed area, irrigating the allowed area, planting the allowed area, and harvesting the allowed area.

8. The method of claim 1, wherein the method further comprises at least one of engaging a braking system for the agricultural vehicle to prevent movement of the agricultural vehicle and disabling an implement of the agricultural vehicle.

9. A method for controlling an operation of an agricultural vehicle comprising:
   receiving a geo-fencing plan for the agricultural vehicle to apply a chemical;
   determining a prohibited area into which the agricultural vehicle is prohibited from entering with the chemical for based on the geo-fencing plan;
   determining a current location of the agricultural vehicle;
   comparing the current location of the agricultural vehicle to one or more predetermined locations to determine whether the agricultural vehicle is in the prohibited area for applying the chemical;
   in response to determining that the agricultural vehicle is in the prohibited area, disabling a sprayer associated with the agricultural vehicle from applying the chemical in the prohibited area; and
   in response to determining that the agricultural vehicle is in an allowed area with an unpermitted chemical, disabling the sprayer.

10. The method of claim 9, further comprising:
    receiving movement data describing a position, acceleration, and direction of the agricultural vehicle;
    analyzing the movement data to predict whether the agricultural vehicle is moving toward the prohibited area; and
    in response to predicting that the agricultural vehicle is moving toward the prohibited area, disabling the sprayer to prevent the agricultural vehicle from applying the chemical and further executing at least one of displaying a warning message to an operator of the agricultural vehicle or disabling the agricultural vehicle.

11. The method of claim 9, further comprising, in response to preventing the agricultural vehicle from applying the chemical, generating and displaying a warning message on a user interface associated with the agricultural vehicle.

12. The method of claim 9, further comprising:
    receiving an override signal configured to override a geo-fencing control; and
    responsive to receiving the override signal, enabling the sprayer to allow applying the chemical when the agricultural vehicle is in the prohibited area.

13. The method of claim 9, wherein the geo-fencing plan includes a plurality of different defined areas in which one or more agricultural actions are allowed or prevented, wherein the one or more agricultural actions includes at least one planting of one or more crops and harvesting of one or more crops.

14. The method of claim 9, wherein the one or more predetermined locations are determined based on the prohibited area.

15. The method of claim 9, wherein the method further comprises at least one of engaging a braking system for the agricultural vehicle to prevent movement of the agricultural vehicle and disabling an implement of the agricultural vehicle.

16. The method of claim 9, further comprising, in response to determining that the agricultural vehicle is not in the prohibited area, utilizing the agricultural vehicle to apply the chemical.

17. A geo-fencing vehicle control system comprising:
    an agricultural vehicle comprising:
      a driveline configured to propel the agricultural vehicle; and
      an operator interface configured receive inputs from a user and display messages to the user;
    a sprayer coupled to the agricultural vehicle, the sprayer configured to distribute a chemical; and
    a vehicle control system comprising one or more processing circuits, each processing circuit including a processor and a memory, the memory having instructions stored thereon that, when executed by the processor, cause the one or more processing circuits to:

receive a geo-fencing plan for the agricultural vehicle;

determine a prohibited area for distributing the chemical by the sprayer based on the geo-fencing plan;

determine a current location of the agricultural vehicle;

comparing the current location of the agricultural vehicle to one or more predetermined locations to determine whether the agricultural vehicle is in the prohibited area for distributing the chemical by the sprayer;

in response to determining that the agricultural vehicle is in the prohibited area, disabling the sprayer to prevent distributing the chemical in the prohibited area; and in response to determining that the agricultural vehicle is in an allowed area with an unpermitted chemical, disabling the sprayer.

18. The geo-fencing vehicle control system of claim 17, wherein the agricultural vehicle is allowed or prevented from executing an agricultural action based on at least one of the current location of the agricultural vehicle or a time of operation of the agricultural vehicle.

19. The geo-fencing vehicle control system of claim 17, wherein the instructions further cause the one or more processing circuits to generate and display a warning message on the operator interface in response to preventing the sprayer from distributing the chemical.

20. The geo-fencing vehicle control system of claim 17, wherein the instructions further cause the one or more processing circuits to receive an override signal configured to override a geo-fencing control and discontinue preventing the sprayer from distributing the chemical when the agricultural vehicle is in the prohibited area in response to receiving the override signal.

\* \* \* \* \*